Patented Nov. 17, 1925.

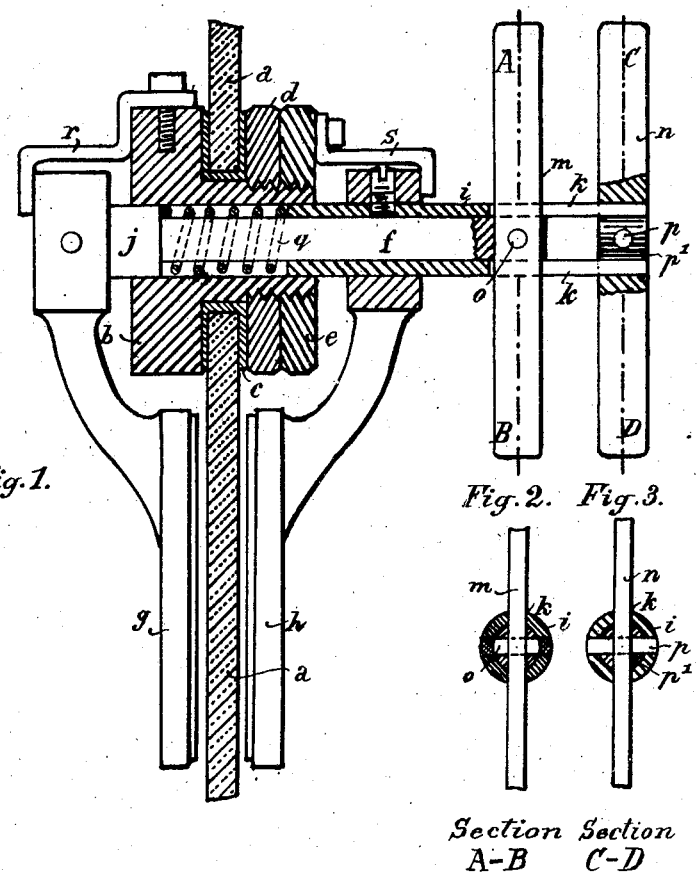
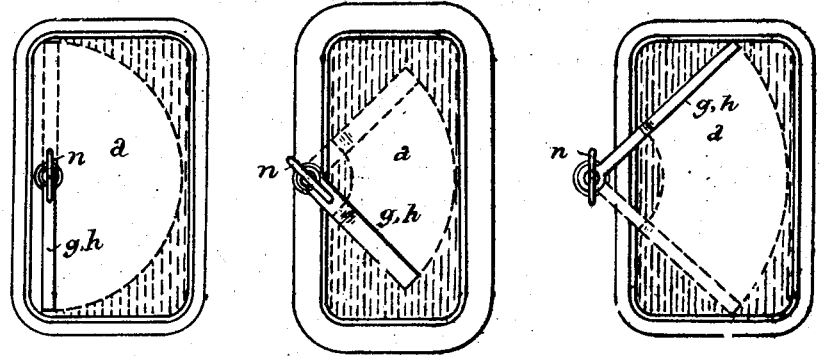

1,562,017

UNITED STATES PATENT OFFICE.

HANS von LITTROW, OF CHEMNITZ, GERMANY.

APPARATUS FOR CLEANING WINDOWS.

Application filed May 24, 1924. Serial No. 715,608.

*To all whom it may concern:*

Be it known that I, HANS VON LITTROW, a citizen of the Republic of Germany, and resident of Chemnitz, in the Free State of Saxony, German Republic, have invented a new and useful Apparatus for Cleaning Windows, of which the following is a specification.

The present invention has for its object an apparatus for cleaning by wipers the panes and window screens or glasses arranged on vehicles of any kind.

For the purpose mentioned before various constructions of cleaning-apparatus have been proposed. For example, said apparatus were so arranged that when used on the outer side of the pane the inner side of the latter was cleaned also by a simultaneous movement of the wiper situated on the other pane-surface, although a cleaning of said surface is perhaps not at all desired, or necessary, as can clearly be seen from the following explanations:

The rubber by which the wipers are generally coated has, as is well known, an intense friction on the pane whilst in a dry state. If the pane is only moist on its outer surface, f. i. by rain, or if it is moist on its inner side alone, f. i. by boiler-steam or human respiration, the wiper firmly adheres to the dry pane-surface and can only be actuated or moved with great difficulty.

Now the present invention has for its object to obviate and remove said disadvantage and to offer, according to the more or less intense deposits on the pane-surfaces, the possibility to actuate against the inner surface singly or against the outer surface alone or, if necessary, to simultaneously actuate on both surfaces by the wipers and to exert a pressure equal on both sides and of any desired intensity, said pressure allowing to also remove hard crusts, as for instance ice.

For obtaining said purpose, one of the wipers is fastened on a central axle and the other one to a sleeve embracing said axle. A spring is inserted between a collar fastened to said axle and the one of the extremities of the sleeve projecting into a socket by which the cleaning apparatus is fastened or held on the pane. Said spring presses the axle and the sleeve away from each other in such a manner that the wiper-carriers are situated at a distance away from both pane-surfaces whereby the rubber or any suitable garniture of the wipers is spared. For the purpose of cleaning one or both pane-surfaces two members are provided for instance in the shape of two handles arranged in parallelism with one another, one of them being fastened to the axle and the other to the sleeve. By seizing both handles by the hand, they can be moved against each other in such a manner that both wiper-carriers collectively move in an arc, whereas either one or the other of the wipers or both of them may be pressed against the pane-surfaces.

An example of construction of the pane cleaning apparatus forming the object of the present invention is represented in the drawing annexed to the description, said apparatus being, for instance, used for the window of the locomotive driver stand.

Fig. 1 is a longitudinal section through the apparatus and a portion of the pane of transparent material adjacent thereto, Figs. 2 and 3 represent vertical sections taken in the plane of the lines A—B and C—D respectively of Fig. 1, and Figs. 4, 5 and 6 represent front views on a smaller scale showing various positions of the centre of the wiper-device proper, said centre being situated either in the pane itself, or within or outside the frame respectively.

In Fig. 1 the pane of glass or other transparent material is denoted by $a$, and the apparatus is arranged to be moved into position to operate on one or both sides of the pane to remove any moisture, such as snow, rain, ice or other matter deposited thereon, which might tend to obstruct the transparency of the pane. An opening for inserting and fastening the cleaning apparatus is arranged in the pane. For this purpose a mounting $b$ arranged with a flange and an outer thread is inserted into the opening mentioned, which mounting rests with its flange against a yielding packing $c$ fitted in the pane $a$.

A nut $d$ is screwed on the thread of the mounting $b$ into position to engage the yielding packing $c$ and fasten the mounting on the pane.

A check-nut $e$ is also screwed on the mounting $b$ to lock the nut $d$ against unintentional displacement.

The axle $f$ embraced by a collar $j$ is inserted into the bore of the sleeve $b$ and carries the outer wiper-carrier $g$. A sleeve $i$ carrying the inner wiper-carrier $h$ is firmly arranged on the axle $f$, said wiper-carrier being connected with the sleeve $i$ by a screw.

$m$ and $n$ are two handles acting as thrusting and pulling members. In the free extremity of the sleeve $i$ a longitudinal slot $k$ is arranged in which the handle $m$ may be moved along. Said handle is fastened to the extremity of the axle $f$ by a peg $o$. The second handle $n$ is fastened to the free extremity of the sleeve $i$ by a peg $p$ passed through a filling piece $p^1$.

A screw or ring-spring $q$ is freely inserted into the sleeve $b$ and wound around the axle $f$, at the same time resting with one of its extremities against the collar $j$ arranged on said axle and with the other one against the front-face of the sleeve $i$ projecting into the bore of the sleeve $b$, said spring $q$ acting against the axle $f$ and the sleeve $i$ in such a manner, that the wiper carriers $g$, $h$, fastened on them are generally held at a distance from the surface of the panes.

A stop $r$ is fastened to the front-surface of the sleeve $b$ and a stop $s$ to the front-surface of the counternut $e$, both stops limiting the movement or displacement of the wiper-carriers $g$ and $h$ outwardly and so holding the spring $q$ under tension.

The centre of the wiper-carriers $g$, $h$ can be differently situated in respect of the panes to be cleaned.

In the arrangement shown in Fig. 4 the centre of the carriers mentioned is situated within the pane itself (in accordance with the arrangement shown in Fig. 1), in Fig. 5 the centre of the carriers is placed within the pane-frame itself and, in Fig. 6, outside the frame and within the front-wall of the locomotive-driver stand.

The mode of operation of the pane-cleaning apparatus described is as follows:

In case it is intended to clean the outer surface of the pane $a$, the handle $m$ is drawn or attracted against the action of the spring $q$ by the hooked fingers of the hand in such a manner that the wiper arranged on the carrier $g$ is pressed on to the outer surface of the pane $a$. By a simultaneous turning movement of the attracted handle $m$ the pane-surface is cleaned whereas the inner wiper-carrier $h$ turns, without effect. If however, it is intended to clean the interior surface of the pane, the handle $n$ is pushed, in contrary to the action of the spring $q$, by the inner surface of the hand against said pane whereby the wiper of the carrier $h$ tightly rests against said interior pane-surface, which is cleaned by the turning movement of the handle $n$, whereas the outer wiper-carrier $g$ partakes of said movement without any effect.

If it is intended to simultaneously clean both pane-surfaces, both handles $m$, $n$ are attracted against each other by clenching the hand and against the effect of the spring $q$. Both handles are hereafter turned and pressed with any desired pressure equal on both sides of the pane against the surface of the latter, whereby hard crusts, for instance of ice, can easily be removed.

It is not excluded to insert the spring $q$ situated according to Fig. 1 between the axle $f$ and the sleeve $i$, between the handles $m$ and $n$.

What I claim is:

1. In a window cleaning apparatus for vehicles of any kind, the combination with a mounting, a plurality of wiper-carriers on said mounting adapted to clean the outer and inner surfaces of a window pane, of a central axle carrying the outer wiper, a sleeve surrounding said axle and carrying the inner wiper, a yielding means interposed between the wiper-carriers for normally holding the wiper-carriers a distance from the window pane, a plurality of stops on said mounting for cooperating with said yielding means for limiting the outward movement of the wiper-carriers, and means for separately moving the wiper-carriers into contact with the surfaces of the pane.

2. In a window cleaning apparatus for vehicles of any kind, the combination with a mounting, wiper-carriers on said mounting adapted to be used separately for cleaning the outer and inner surfaces of a window pane, of a central axle carrying the outer wiper, a collar on one end of said axle, a sleeve extending through the mounting and surrounding said axle, said sleeve carrying the inner wiper, a spring around said axle between said collar and sleeve, a plurality of stops on the mounting cooperating with said spring for normally holding both wiper-carriers at a distance from the pane surfaces, handle members fastened respectively to the sleeve and axle, and a longitudinal slot in the sleeve for permitting relative displacement of said members and wiper-carriers associated therewith.

In testimony, that I claim the foregoing as my invention, I have signed my name this 6th day of May 1924.

HANS von LITTROW.